United States Patent [19]

Stanley et al.

[11] Patent Number: 5,716,071
[45] Date of Patent: Feb. 10, 1998

[54] ELECTRICALLY OPERATED SLIDER RELEASE

[75] Inventors: Patrick L. Stanley, 2914 N. Grant, Enid, Okla. 73703; Alan C. Lesesky, Charlotte, N.C.; Bobby Weant, Rock Hill, S.C.

[73] Assignee: Patrick L. Stanley, Enid, Okla.

[21] Appl. No.: 261,924

[22] Filed: Jun. 17, 1994

[51] Int. Cl.⁶ .................................................. B60E 5/00
[52] U.S. Cl. ................... 280/407.1; 33/708; 280/149.2
[58] Field of Search ........................... 280/405.1, 407.1, 280/149.2; 33/708, 203.12, 600

[56] References Cited

U.S. PATENT DOCUMENTS

| | | | |
|---|---|---|---|
| 2,710,201 | 6/1955 | Winn | 280/430 |
| 2,835,504 | 5/1958 | Acker | 280/81 |
| 2,841,411 | 7/1958 | Sheppard et al. | 280/81 |
| 2,860,891 | 11/1958 | Ramun | 280/407 |
| 2,900,194 | 8/1959 | De Lay | 380/34 |
| 2,918,301 | 12/1959 | McKay | 280/81 |
| 2,962,295 | 11/1960 | Tenenbaum | 280/81 |
| 3,087,741 | 4/1963 | De Lay | 280/81 |
| 3,096,993 | 7/1963 | McKay | 280/81 |
| 3,126,209 | 3/1964 | Jewell et al. | 280/81 |
| 3,177,002 | 4/1965 | Schmidt | 280/81 |
| 3,300,228 | 1/1967 | Bertolini et al. | 280/81 |
| 3,372,946 | 3/1968 | Hutchens | 280/81 |
| 3,618,969 | 11/1971 | Glassmeyer | 280/80 B |
| 3,622,178 | 11/1971 | Tantlinger | 280/150.5 |
| 3,778,079 | 12/1973 | Vornberger et al. | 280/80 B |
| 4,132,326 | 1/1979 | Pinto | 214/515 |
| 4,273,347 | 6/1981 | Hulse | 280/80 B |
| 4,286,797 | 9/1981 | Mekosh, Jr. et al. | 280/80 B |
| 4,353,565 | 10/1982 | Smith et al. | 280/80 B |
| 4,635,742 | 1/1987 | Bertolini | 180/209 |
| 4,641,846 | 2/1987 | Ehrhart | 280/80 B |
| 4,660,843 | 4/1987 | Hicks | 280/80 B |
| 4,836,735 | 6/1989 | Dennehy, Jr. t al. | 414/475 |
| 4,838,566 | 6/1989 | Baxter et al. | 280/149.2 |
| 4,838,578 | 6/1989 | Baxter | 280/149.2 |
| 4,919,445 | 4/1990 | Robey | 280/149.2 |
| 4,944,522 | 7/1990 | Hart | 280/149.2 |
| 4,958,845 | 9/1990 | Parks | 280/407.1 |
| 4,993,737 | 2/1991 | Torcomian | 280/407 |
| 5,013,058 | 5/1991 | Kruger | 280/429 |
| 5,035,439 | 7/1991 | Petrillo | 280/81.6 |
| 5,040,826 | 8/1991 | Lovell | 280/840 |
| 5,137,296 | 8/1992 | Forman | 280/407.1 |
| 5,314,201 | 5/1994 | Wessels | 280/407.1 |
| 5,386,642 | 2/1995 | Spies | 33/708 |
| 5,442,865 | 8/1995 | Wallrafen | 33/708 |

*Primary Examiner*—Anne Marie Boehler
*Attorney, Agent, or Firm*—Robert A. Felsman; Mark D. Perdue

[57] ABSTRACT

A rotary prime mover, preferably an electric motor, is remotely operable from the cab of the vehicle. A linkage couples the rotary prime mover to the pins of the slider assembly, wherein rotation of the rotary prime mover selectively moves the pin in and out registry with holes in a pair of rails on the trailer to prevent and permit relative movement between the rear tandem axle assembly and the trailer. A pin sensor is coupled to the linkage to detect whether the pins are in or out of registry with the holes in the rails and a counter is coupled between the rear tandem axle assembly and the trailer to determine with which of the holes in the rails the pins are aligned. A visual display is provided in the cab and coupled to the pin sensor and counter to communicate to the operator the registry of the pins and with which of the holes the pins are aligned. The visual display in the cab includes visible, lighted indications of whether the pins are in or out of registry with the holes in the rails and whether pins are bound in the holes. The visual display also includes a numerical counter to inform the operator with which of the holes the pins are aligned. The visual display also includes audible and visual warnings to alert the operator if the slider release assembly is in one of several unsafe conditions.

10 Claims, 14 Drawing Sheets

|  | DRIVE MEMBER START | DRIVE MEMBER END | DRIVE MEMBER TRANSLATING |
|---|---|---|---|
| DRIVEN MEMBER START | GREEN | RED/ BLINKING AMBER | RED/ AMBER |
| DRIVEN MEMBER END | RED BLINKING AMBER | RED | RED |
| DRIVEN MEMBER TRANSLATING | RED/ BLINKING AMBER | RED/ BLINKING AMBER | RED/ AMBER |

Fig. 10

ELECTRICALLY OPERATED SLIDER RELEASE

BACKGROUND OF THE INVENTION

1. Field of the Invention

The present invention relates generally to safety equipment for use with tractor trailers. More specifically, the present invention relates to apparatus for remotely operating the slider between the rear tandem axle assembly of a tractor trailer and the trailer.

2. Background Information

Tractor-trailers and other similar freight hauling vehicles commonly are provided with a sliding connection between the trailer and the rear tandem axle assembly. This assembly comprises a pair of parallel rails secured to the trailer. The rails are provided with a plurality of holes spaced longitudinally along the rails. At least one pin, usually four, are carried by the rear tandem axle assembly for registry with the holes in the rails. Normally, the pins are maintained in registry with the rails so that the rear wheel tandem axle assembly is not movable relative to the trailer. The pin and rail arrangement commonly is referred to as the "slider."

At times, because of roadway regulations or a need to reduce the turning radius of the vehicle, it becomes desirable to alter the wheel base of the tractor-trailer by moving the trailer relative to the rear tandem axle assembly. Conventional tractor-trailers having a slider assembly provide a manual lever arrangement to retract the pins from registry with the holes in the rails, thus permitting relative movement between the trailer and the rear tandem axle assembly. The mechanism for retracting the pins commonly is referred to as the "slider release."

In operation, the rear tandem axle brakes are locked and the operator or operator's partner exits the tractor cab to manipulate the manual slider release to retract the pins from registry with the rails. With the rear tandem axle assembly now movable relative to the trailer, the tractor is employed to push or pull the trailer over the stationary tandem axle assembly. Upon obtaining the desired wheel base dimension, the pins are manually extended into registry with the appropriate holes in the rails by manipulation of the manual lever arrangement. Then, the rear tandem axle brakes are released and the tractor-trailer may be driven normally.

This manual operation is very clumsy and possesses a number of drawbacks. First, it requires that the truck operator or a partner exit the cab of the vehicle. This is a major drawback because it greatly increases the vulnerability of the operator or partner to injury, either from slip-and-fall accidents while exiting and reentering the cab, or from the operator's proximity to the wheels and trailer during manual operation of the slider release.

Second, this manual operation is extremely time-consuming. If the truck operator is solo, he or she must exit the cab repeatedly during adjustment of the slider assembly. This in itself is time-consuming. Furthermore, for precision adjustment, for example, to conform to weight limits on the rear axles, alignment of the pins with a particular set of holes may be necessary. Precision operations may necessitate several trips between the cab and the slider release to achieve the appropriate positioning of the rear tandem axle relative to the trailer. Manual operation of the slider assembly thus can occupy an operator for significant periods of time, which is unacceptable in long-haul trucking where minutes may determine whether delivery of cargo is timely and full payment is due for the haul.

Third, manual manipulation of the slider assembly normally requires substantial physical strength. This is particularly true if the pins bind in the holes, making retraction of the pins from the holes very difficult, if not impossible. The strength requirement is an obstacle for almost any operator, but becomes a larger obstacle as greater numbers of women are engaged in tractor-trailer operation, both on their own and as part of husband-and-wife driving teams. The difficulty of manual operation of the slider release may even deter the operator from altering the wheelbase, resulting in less than optimum wheelbase configurations and possibly costly citations from roadway regulatory authorities.

One alternative to the manually operated slider assembly is to provide a pneumatic cylinder coupled to the manual lever arrangement to effect semi-automatic or automatic retraction of the pins. Pneumatically operated slider release assemblies are disclosed in U.S. Pat. Nos. 4,353,565, 4,944, 522, 4,933,737, and 5,137,296. A drawback common to pneumatically operated systems is that the air pressure required for operation is drawn from the compressor and other equipment associated with the pneumatic braking system found in most tractor-trailers. Tapping into the braking system involves tampering with among the most critical safety systems in a tractor-trailer. Failure of any component of the pneumatically operated slider release assembly could cause failure of the braking system, leading to obviously disastrous results. Additionally, pneumatically operated systems require extensive structural modification of existing slider release assemblies, which is costly and cumbersome, and prevents these systems form having universal adaptability.

A need exists, therefore, for a slider assembly that is remotely operable, is not coupled to the pneumatic brake system of a tractor-trailer, and that supplies the operator with the information necessary to change the wheel base of the tractor-trailer by movement of the rear tandem axle assembly relative to the trailer without exiting the cab.

SUMMARY OF THE INVENTION

It is a general object of the present invention to provide an improved slider release assembly for use with a tractor-trailer or other vehicle.

This and other objects of the present invention are accomplished by providing a rotary prime mover, preferably an electric motor, that is remotely operable from the cab of the vehicle. A linkage couples the rotary prime mover to the pins of the slider assembly, wherein rotation of the rotary prime mover selectively moves the pin in and out of registry with holes in a pair of rails on the trailer to prevent and permit relative movement between the rear tandem axle assembly of and the trailer. A pin sensor is coupled to the linkage to detect whether the pins are in or out of registry with the holes in the rails and a counter is coupled between the rear tandem axle assembly of the trailer to determine with which of the holes in the rails the pins are aligned. A visual display is provided in the cab and coupled to the pin sensor and counter to communicate to the operator the registry of the pins and with which of the holes the pins are aligned.

According to a preferred embodiment of the present invention, the linkage includes a translator for translating the rotary motion of the electric motor into linear motion useful in moving the pins into and out of registry with the holes in the rails. The translator comprises a housing and a lead screw rotatably disposed in the housing and coupled to the prime mover. A biasing member is disposed in the housing and is engaged by a drive member, responsive to rotation of the lead screw, to urge a driven member. The driven member is coupled by a linkage to the pins and movement of the driven member responsive to the urging of the biasing member moves the pins out of registry with the holes in the rails.

According to a preferred embodiment of the present invention, the pin sensor is coupled to the translator and comprises a plurality of magnetic reed switches. Magnets on the drive and driven members of the translator align with and close the magnetic reed switches to control the operation of the electric motor and to indicate to the operator whether the pins are in or out of registry with the holes in the rails.

According to a preferred embodiment of the present invention, the counter comprises an elongate member having a plurality of magnetic reed switches disposed therein at locations corresponding to the positions of the holes along the rail. The elongate member is carried by one of the rear tandem axle assembly and the trailer. A magnet is carried by the other of the rear tandem axle and the trailer, wherein relative movement between the rear tandem axle assembly and the trailer moves the magnet proximal to one of the plurality of reed switches, thereby closing the reed switch and providing an indication to the operator of with which of the plurality of holes the pins are aligned.

According to a preferred embodiment of the present invention, the visual display in the cab includes visible, lighted indications of whether the pins are in or out of registry with the holes in the rails and whether pins are bound in the holes. The visual display also includes an indicator to inform the operator with which of the holes the pins are aligned. The visual display also includes audible and visual warnings to alert the operator if the slider release assembly is in one of several unsafe conditions.

Other objects, features, and advantages of the present invention will become apparent with reference to the detailed description, which follows.

DESCRIPTION OF THE DRAWINGS

FIG. 10 is a table representing a portion of the operation of the display of FIG. 9.

DESCRIPTION OF THE PREFERRED EMBODIMENT

Figure 1:
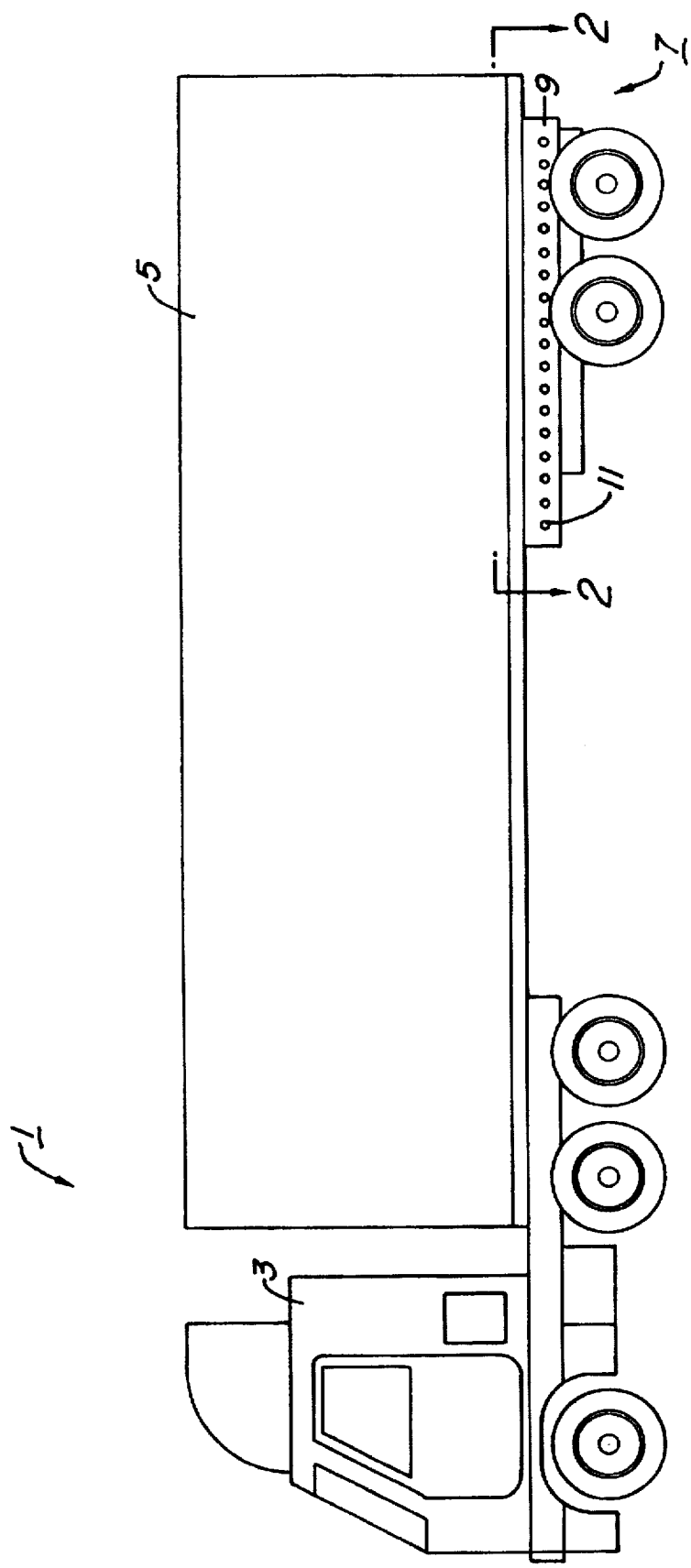
FIG. 1 is an elevation view of a tractor-trailer of the type contemplated for use with the present invention.

Referring now to FIG. 1, a tractor-trailer 1 of the variety in which the present invention is utilized is illustrated. Tractor-trailer 1 includes a tractor portion 3 and a trailer 5 coupled thereto. A rear tandem axle assembly 7 ("wheel tandem" or "tandem" is intended to include single axle assemblies as well as multiple axle assemblies) is coupled to trailer 5 by a pair of parallel, spaced-apart rails 9, which are secured to trailer 5. Each rail 9 includes a plurality of holes 11 longitudinally spaced along its length.

Figure 2:
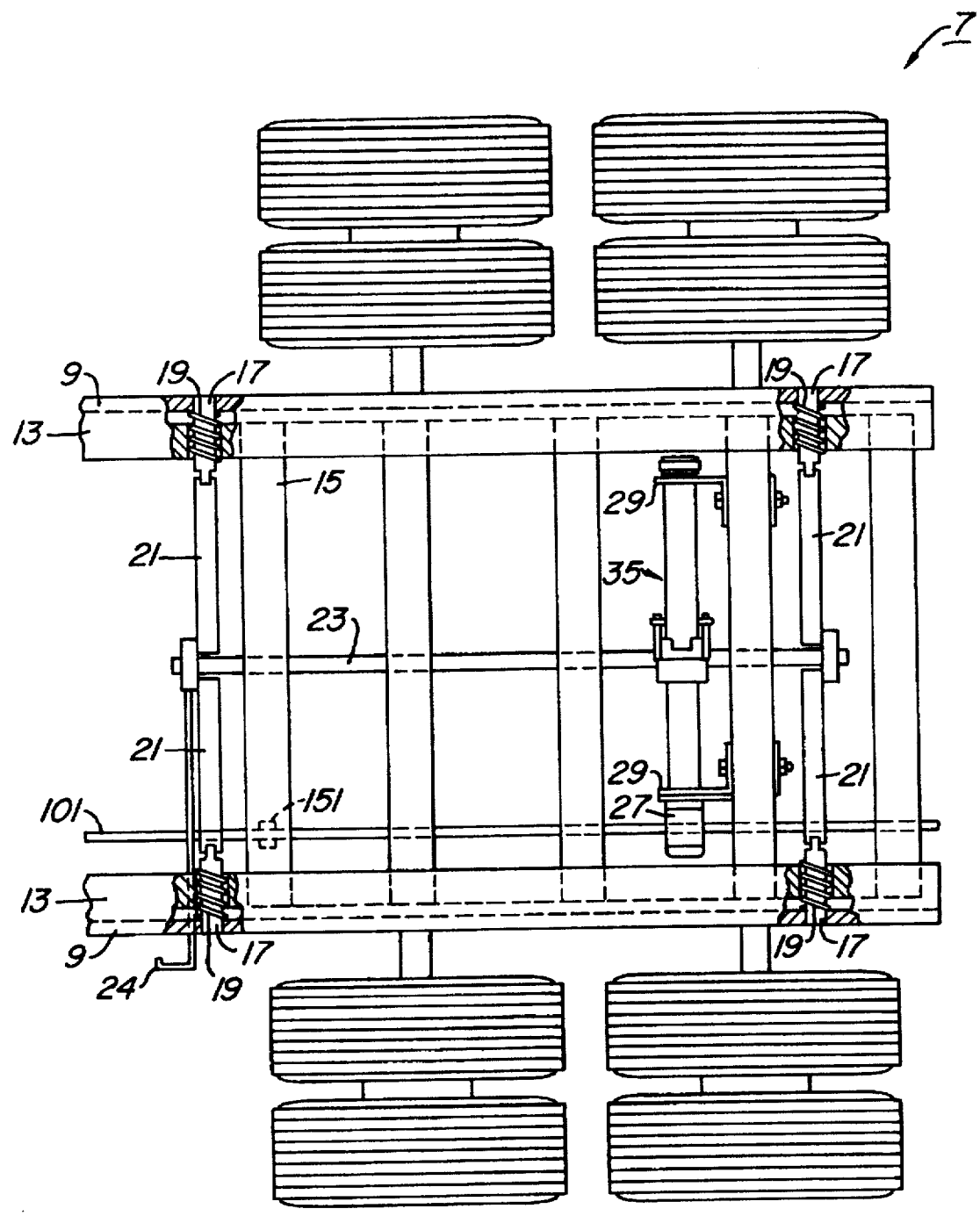
FIG. 2 is a plan view of a rear tandem axle assembly including portions of the electrically operated slider release according to the present invention.
Figure 3:
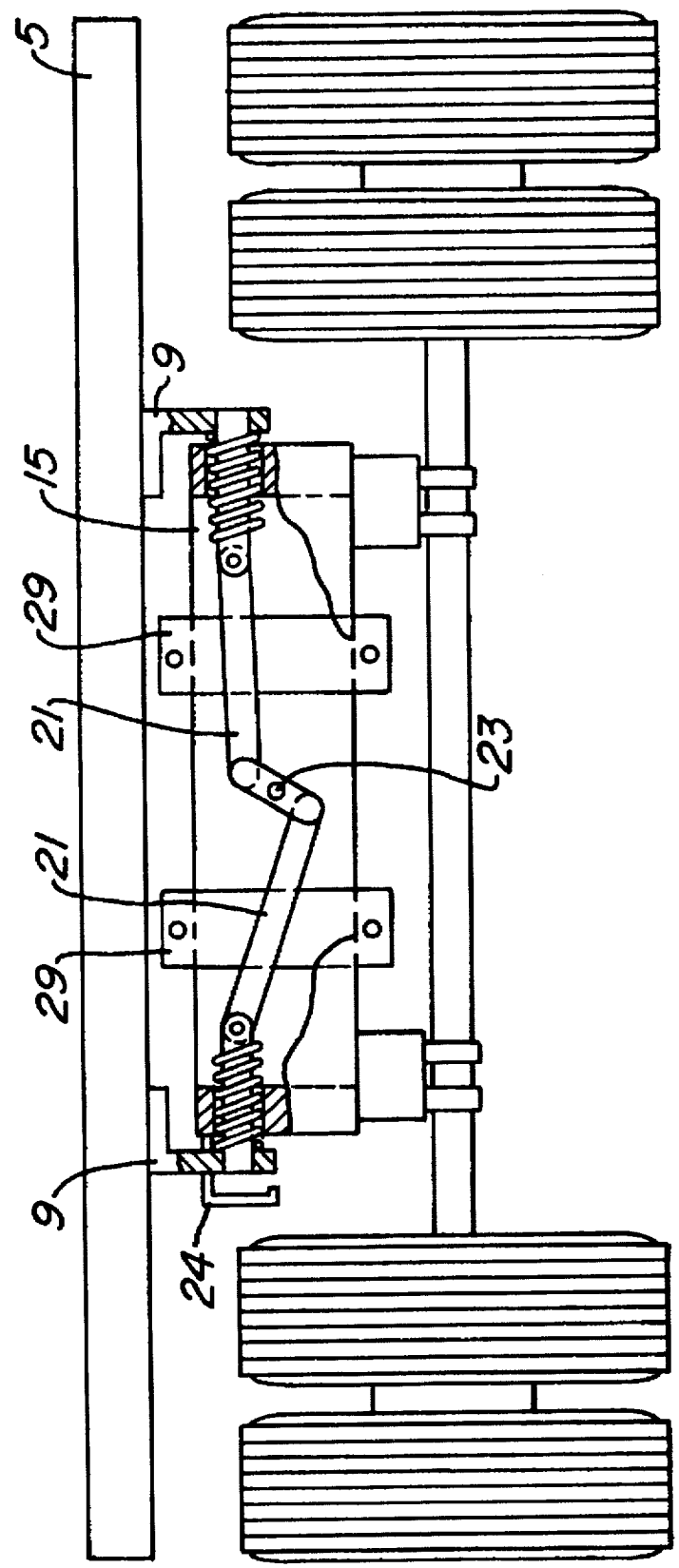
FIG. 3 is an end elevation view of the rear tandem axle of FIG. 2.

FIGS. 2 and 3 illustrate wheel tandem 7 in plan view and end view, respectively. Wheel tandem 7 generally comprises a pair of longitudinally extending, generally parallel frame members 13 just inboard of rails 9. Frame members 13 are connected by a plurality of transverse cross-members 15.

Four pins 17 are carried by frame members 13 and are biased outwardly by coil springs 19 to extend pins 17 into registry with holes (11 in FIG. 1) in rails 9. Each pin 17 is coupled to a link 21, which is coupled to a control shaft 23 carried by cross members 15. A manual operation lever 24 is coupled between control shaft 23 and frame member 13. Pins 17, springs 19, links 21, and manual operation lever 24 are conventional and are provided on most trailers on the road today. This mechanism commonly is referred to as a "slider release."

In operation, manual operation lever 24 is manipulated to cause rotation of control shaft 23, which causes links 21 to exert force inwardly on pins 17, thus overcoming the biasing force of springs 19 to retract pins 17 inwardly of rails 9 and out of registry of holes (11 in FIG. 1). Trailer 5 then is free to slide relative to wheel tandem 7 for adjustment of the wheel base of tractor-trailer 1. With pins 17 extended into registry with holes 11, pins 17 are said to be "locked." With pins 17 retracted from registry with holes 11, pins 17 are said to be "unlocked."

A translator 25 and electric motor 27 are secured to a cross member 15 by means of conventional bolts and brackets 29. Translator 25 is provided to convert or translate the rotary motion of electric motor 27 into motion useful in moving pins 17 into and out of registry with holes (11 in FIG. 1) in rails 9. A preferred electric motor 27 is manufactured by Baldor Electric of Ft. Smith, Ark. and designated Frame No. 125-PSMHO T31442. The detailed construction of translator 25 is described below with reference to FIGS. 4, 5, and 6.

An elongate sensor 101 is shown in phantom in FIG. 2 to illustrate its location parallel to rails 9. Elongate sensor 101 preferably is secured to trailer 5 by conventional means and forms a portion of a counter that is described in detail below with reference to FIGS. 7 and 8. A magnet 151 is carried by a cross-member 15 proximal to elongate sensor 101 to register with and close magnetic reed switches (illustrated in FIG. 7) carried in elongate sensor 101.

Figure 4:
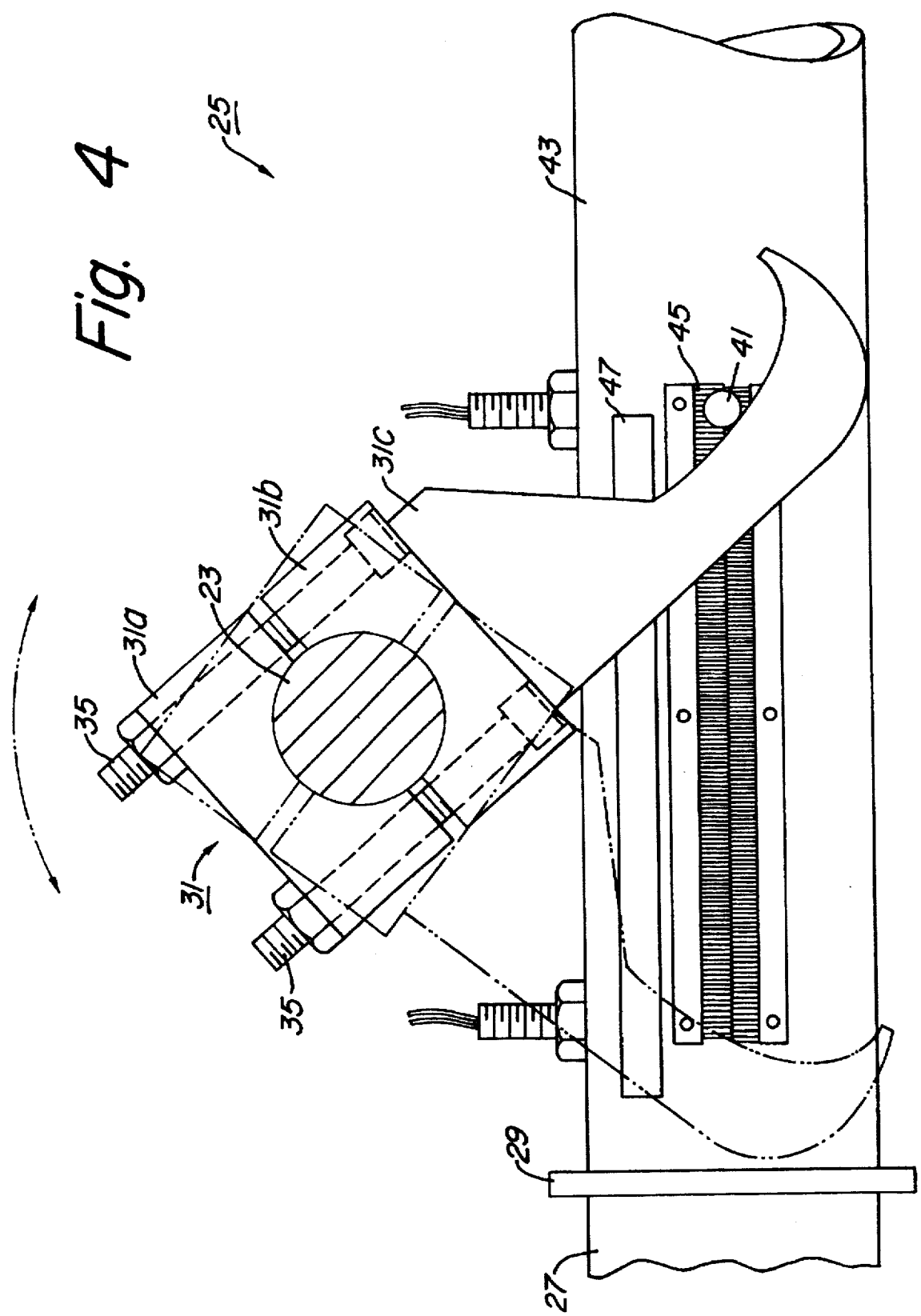
FIG. 4 is an elevation view of a portion of the translator assembly of the electrically operated slider release according to the present invention.
Figure 5:
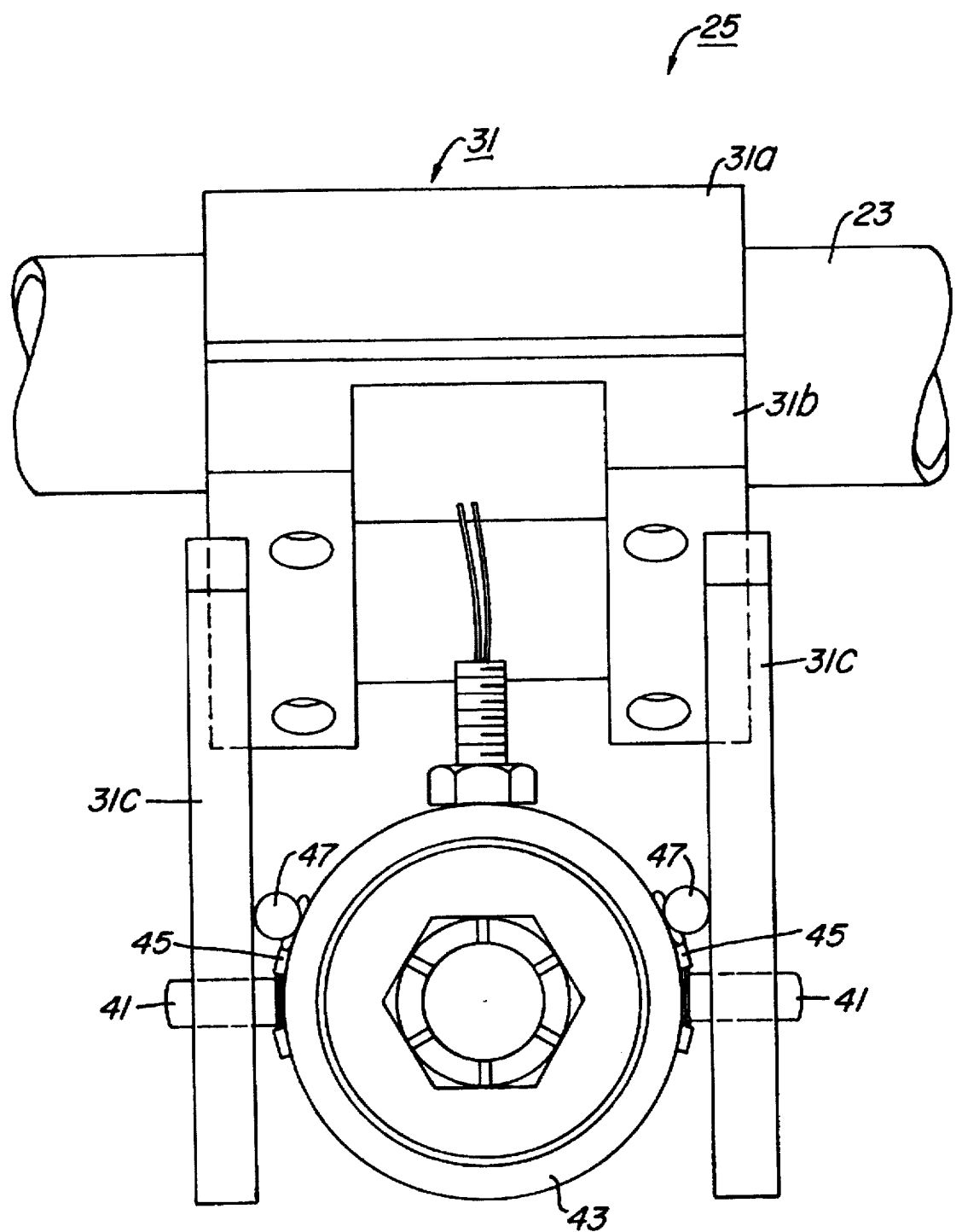
FIG. 5 is an end elevation view of the assembly of FIG. 4.

FIGS. 4 and 5 are a partial elevational view and an end view, respectively, of translator assembly 25 according to the present invention. A fork 31 is coupled to control shaft 23 and comprises an upper half 31a, a lower half 31b, and a pair of prongs 31c extending therefrom. Upper and lower halves 31a, 31b of fork 31 are secured around and against rotation relative to control shaft 23 by bolts 35.

A pair of pins 41 extend from a cylindrical housing 43 and into engagement with prongs 31c of fork 31. Pins 41 extend through a pair of longitudinal slots (not shown) in cylindrical housing 43, which are sealed against entry of debris and foreign matter by conventional brush seals 45. A pair of rods 47 are welded to the exterior of cylindrical housing 43 to maintain proper alignment between pins 41, cylindrical housing 43, and prongs 31c of fork 31. As illustrated in phantom in FIG. 4, translation of pins 41 relative to cylindrical housing 43 causes fork 31 to move between a first and a second position, which causes rotation of control shaft 23 and moves pins (17 in FIG. 2) into and out of registry with holes (11 in FIG. 1) in rails (9 in FIGS. 1 and 2).

Figure 6:
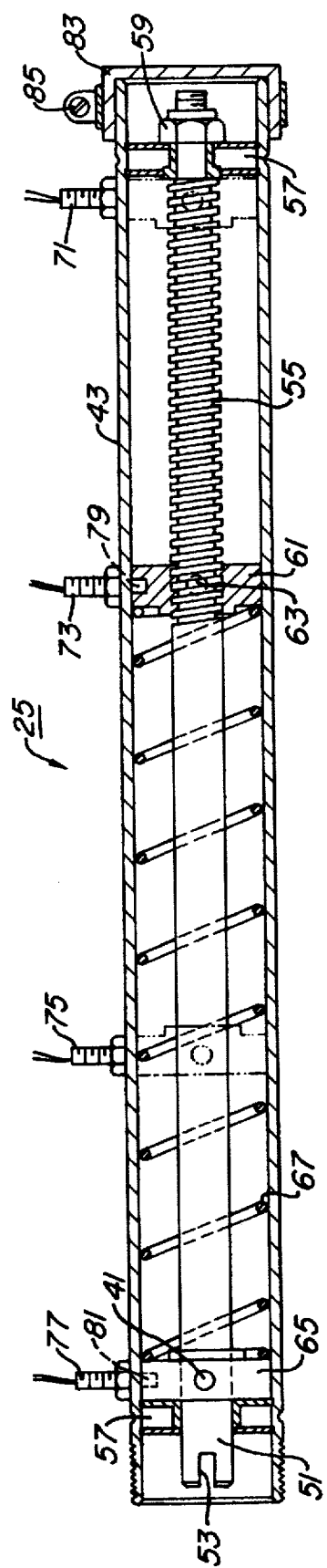
FIG. 6 is a longitudinal section view of the translator assembly of the electrically operated slider mechanism according to the present invention.

FIG. 6 depicts, in longitudinal section view, the construction of the portion of translator 25 that is contained within cylindrical housing 43. A lead screw 51 is rotatably disposed in cylindrical housing 43. Lead screw 51 includes a notch 53 at one end for connection to motor (27 in FIGS. 2 and 4). At the opposite end of lead screw 51, a length of 0.750 inch diameter by six thread-per-inch Acme threads are provided. A pair of lead screw supports 57 are disposed in the ends of cylindrical housing 43 and receive and support lead screw 51 within housing 43. Lead screw supports 57 are provided with oil-impregnated bronze bushings to facilitate rotation of lead screw 51 therein.

A nut 59 on the terminal end of lead screw 51 cooperates with a shoulder on lead screw 51 and lead screw support 57 to position and secure lead screw 51 longitudinally within cylindrical housing 43. Nut 59 is releaseably secured against removal from lead screw 51 by a spring-tension pin (not shown) and thus provides a means for manually actuating lead screw 51 with a wrench if motor 27 or some other portion of translator 25 becomes inoperable.

An annular drive member 61, preferably formed of CDA 619 or 623 bronze, is disposed at one end of cylindrical housing 43 and is coupled to Acme threads 55 on lead screw 51. A pair of lugs 63 on drive member 61 engage a pair of longitudinal slots (not shown) in the wall of cylindrical housing 43 to prevent rotation of drive member 61. An annular driven member 65, preferably formed of 304 stainless steel, is disposed at the opposite end of cylindrical housing 43 and is slidably connected with the unthreaded portion of lead screw 51. Pins 41, which engage prongs of fork (31c and 31 in FIGS. 4 and 5), extend from driven member 65 outwardly through cylindrical housing 43 through a pair of longitudinal slots (not shown) in cylindrical housing 43. Driven member 65 also is provided with an oil-impregnated bronze bushing to facilitate its movement over lead screw 51.

A biasing member in the form of a coil spring 67 is disposed in cylindrical housing 43 in abutting relationship between drive member 61 and driven member 65. Coil spring 67 is selected to generate sufficient force upon compression to at least overcome the biasing force provided to pins 17 by pin springs 19, as will be understood with reference to the operation of translator portion 25 of the present invention.

Four conventional reed switches 71, 73, 75, 77 are secured to and longitudinally spaced along cylindrical housing 43. A pair of drive switches 71, 73 are secured to housing 43 at points corresponding to the limits of travel of drive member 61. A pair of driven switches 75, 77 are secured to housing 43 at locations corresponding to the limits of travel of driven member 65. An alnico magnet 79, 81 is carried by each of drive and driven members 61, 65 to register with and close reed switches 71, 73, 75, 77 when magnets 79, 81 are aligned proximal to switches 71, 73, 75, 77.

A rubber or plastic cap 83 is retained on the open end of cylindrical housing 43 by a conventional hose clamp 85. Cap 83 serves to prevent debris and foreign matter from entering housing 43, yet is removed easily to provide access to nut 59 on lead screw 51. The opposite end of cylindrical housing 43 is closed by its threaded connection to its mounting bracket and motor (27 in FIGS. 2 and 4).

With reference to FIG. 1–6, the operation of the mechanical components of the present invention illustrated therein and described above will be described. Normally, wheel tandem 7 is maintained in a fixed position relative to trailer 5 by registry of pins 17 with holes 11 in rails 9. When it becomes desirable to change the wheel base of tractor-trailer 1 by moving trailer 5 relative to wheel tandem 7, the rear brakes are applied. Next, motor 27 is activated, preferably remotely from tractor cab 3 of tractor-trailer 1. Electric motor 27 causes lead screw 51 to rotate within housing 43.

Rotation of lead screw 51 causes drive member 61 to translate from a start position (shown in phantom in FIG. 6) in alignment with drive switch 71 to an end position in alignment with drive switch 73. Movement of magnet 79 carried by drive member 61 from alignment proximal to drive switch 71 to alignment proximal to drive switch 73 generates a motor control signal that prevents motor 27 from rotating lead screw 51 to prevent damage to Acme threads 55 resulting from turning lead screw 51 when drive member 61 is at its limits of travel over threaded portion 55.

Translation of drive member 61 from the start position to the finish position compresses coil spring 67 against driven member 65. Compressed spring 67 urges driven member 65 and pins 41 against prongs 31c of fork 31. Because coil spring 67 is selected to generate sufficient force to overcome the biasing force of pin springs 19, pins 17 are retracted from registry with holes 11 in rails 9 by rotation of control shaft 23 by fork 31.

However, if pins 17 bind in holes 11, due to corrosion, twisting of the frame of tractor-trailer 1 or other misalignment, etc., pins 17 usually will not be retracted. But, even when pins 17 are bound in holes 11, force from compressed spring 67 still bears on control shaft 23 through fork 31, pins 41, and driven member 65. Thus, rocking tractor-trailer 1 (small back-and-forth movement of tractor 3) momentarily will unbind pins 17, permitting their retraction. In addition, provision of spring 67 as a principal force-transferring member provides compliance in translator 25, thus avoiding application of "brute force" to any of the components thereof and enhancing the operating life and reliability of translator 25.

With pins 17 retracted from holes 11 in rails 9, trailer 5 may be moved relative to wheel tandem 7 to adjust the wheelbase of tractor-trailer 1. As long as driven member 65 is in its end position, pins 17 remain retracted and trailer 5 is movable relative to wheel tandem 7.

When it is desired to secure trailer 5 against movement relative to wheel tandem 7, motor 27 is activated in reverse to rotate lead screw 51 and translate drive member 61 back to the start position. With drive member 61 in the start position, no force is exerted on spring 67, and driven member 65 and pins 41 are free to slide within and relative to housing 43 and lead screw 51. Thus, fork 31 is free to move and control shaft 23 is free to rotate, and pin springs 19 will extend pins 17 outwardly and into registry with holes 11 in rails 9.

Movement of driven member 65 between the start position (shown in phantom in FIG. 6) in alignment with driven switch 75 and its end position in alignment with driven switch 77 corresponds to movement of pins 17: if driven member 65 is in its start position, pins 17 necessarily must be extended into registry with holes 11 in rails 9; if driven member 65 is in its end position, pins 17 necessarily must be retracted from registry with holes 11 in rails 9. Thus, if magnet 81 carried by driven member 65 is aligned proximal to driven switch 75 (start position), the switch is closed and a signal is generated that indicates the pins 17 are in registry with holes 11 in rails 9. If magnet 81 is aligned proximal to driven switch 77 (end position) the switch is closed and a signal is generated that indicates that pins 17 are retracted from registry with holes 11 in rails 9. Additionally, alignment of magnet 81 and driven member 65 with driven switch 77 (end position) generates a motor control signal to stop motor 27 without regard to the position of drive member 61 relative to drive switches 71, 73.

Figure 7:
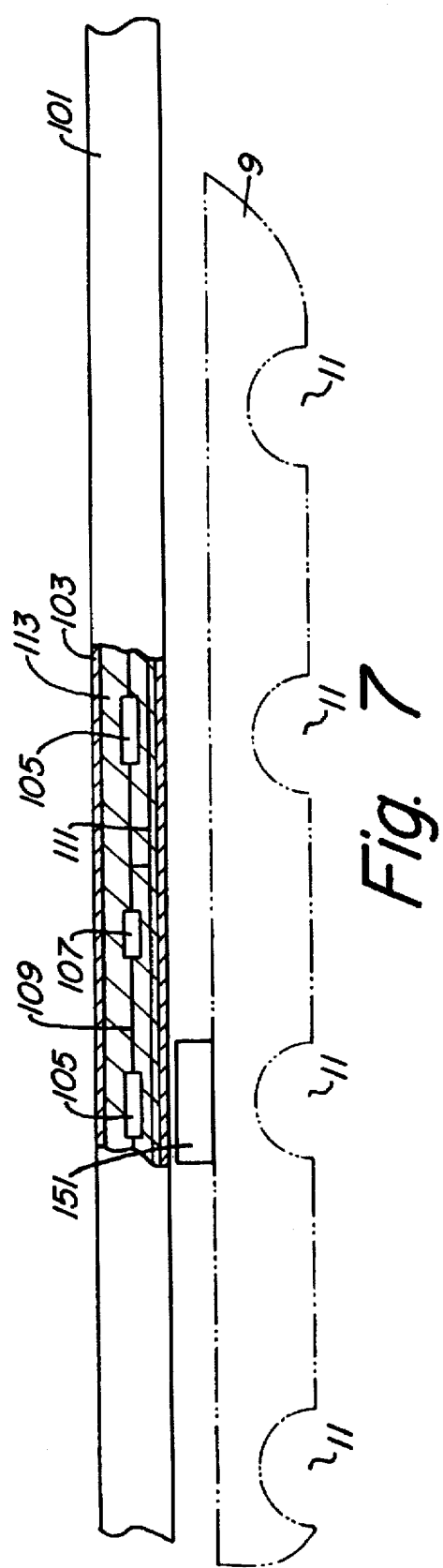
FIG. 7 is an elevation view, partly in section, of the elongate sensor portion of the counter according to the present invention.
Figure 8:
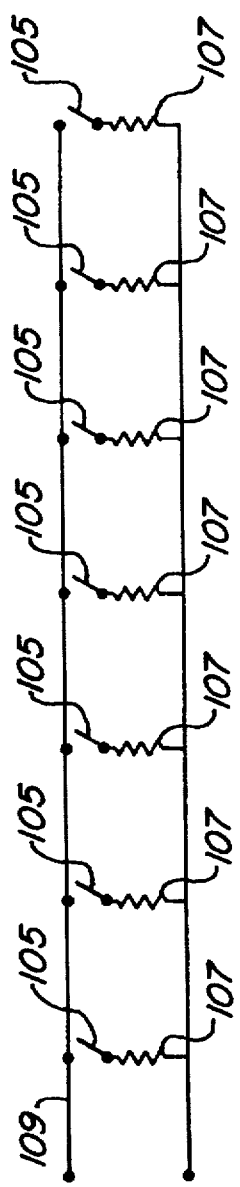
FIG. 8 is an electrical schematic depicting the circuit employed in the elongate sensor of FIG. 7.

FIGS. 7 and 8 are a partial section view, and electrical schematic, respectively, depicting elongate sensor 101 according to the present invention. Elongate sensor 101 comprises an elongate hollow housing 103, preferably formed of plastic or other substantially non-magnetic material. Housing 103 preferably is coupled to the trailer in a location parallel with rails (9 in phantom). Disposed within housing 103 are a plurality of magnetic reed switches 105. Magnetic reed switches 105 are spaced apart within housing 103 at distances corresponding to the distances between the centers of holes 11 in rails 9 (shown in phantom). A resistor 107 is coupled in parallel between each of the reed switches and between conductors 109 and 111. Each resistor 107 has a resistance value substantially different from every other resistor 107, wherein upon closing of reed switch 105 associated with resistor 107, the circuit generates a signal characteristic that is indicative of which of reed switches 105 is closed. The positions of switches 105, resistors 107, and conductors 109, 111 in housing 103 are fixed by filling housing 103 with a filler material 113, preferably foam.

An alnico magnet 151 preferably is secured to a cross member (15 in FIG. 2) on wheel tandem (7 in FIG. 1) in a position proximal to elongate sensor 101 such that upon alignment of magnetic 151 proximal to reed switch 105, reed switch 105 is closed and a circuit is formed generating a signal characteristic indicative of which of reed switches 105 is closed.

According to a preferred embodiment of the present invention, a single reed switch 105 is aligned with each hole 11 in rails 9, usually 24. Thus, as wheel tandem 7 is moved relative to trailer 5, magnet 151 moves relative to elongate sensor 101 closing reed switches 105 and generating a signal indicative of with which of holes 11, pins 17 are aligned. This signal is utilized by control circuitry described below to provide a counter that gives the operator a numerical indication of with which holes 11 pins 17 are aligned, e.g., a display of the numeral "1" when pins 17 are aligned with the forwardmost hole, and a display of "24" when pins 17 are aligned with the aftmost hole.

Figure 9:
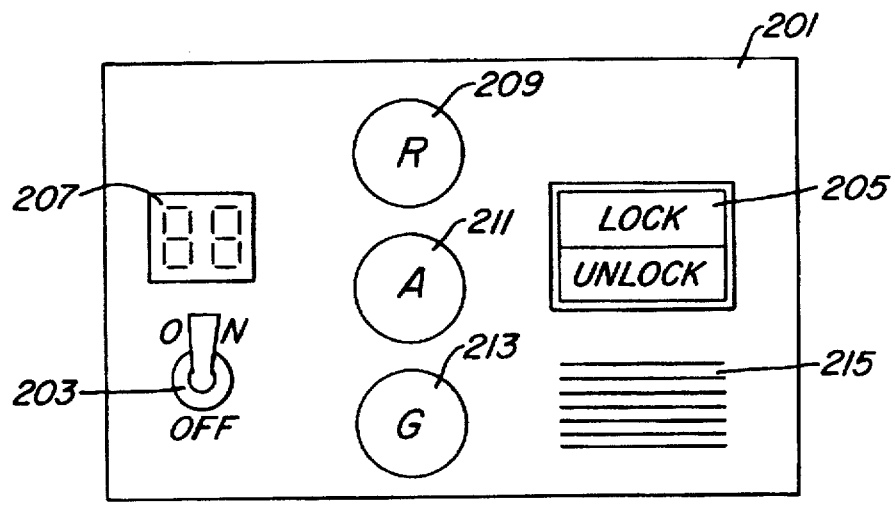
FIG. 9 is an elevation view of a preferred display according to the present invention.

Referring now to FIG. 9, a visual and audible display 201 according to a preferred embodiment of the present invention is illustrated. Display 201 includes an on/off switch 203, and a rocker switch 205 movable between LOCK and UNLOCK modes of operation. A two-digit, seven-segment digital display 207 is provided to display the numerical indication of with which of holes 11 pins 17 are aligned, as described above. Display 201 further is provided with red 209, amber 211, and green 213 lamps which indicate whether pins 17 are in the locked or unlocked or bound positions as will be described below. A buzzer 215 or audible signal is provided to alert the operator of potentially dangerous conditions, as will be described further below.

As described above with reference to FIG. 6, alignment of drive member 61 and driven member 65 with drive switches 71, 73 and driven switches 75, 77 variously close switches 71, 73, 75, 77 to generate signals for control of motor 27 and also to indicate whether pins 17 are locked or unlocked. Thus, drive member 61 and driven member 65 can occupy either their start or end positions or be translating therebetween. Drive switches 71, 73 and driven switches 75, 77 are coupled to lamps 209, 211, 213 of display 201 and thus provide an indication to the operator as to the condition of pins 17: whether they are retracted from registry with holes 11 (unlocked) or whether they are extended into registry with holes 11 (locked).

FIG. 10 is a table indicating preferred visual warnings in the form of combinations of illuminated lamps 209, 211, 213 correlated to the position of drive and driven members 65, 65. Green lamp 213 is illuminated when both drive and driven members 61, 65 occupy their start positions, indicating that pins 17 are fully locked and extending into registry with holes 11 in rails 9. In all other conditions, red lamp 209 is illuminated, indicating that the operator should not attempt to drive tractor-trailer 1 for any purpose other than to obtain relative movement between trailer 5 and wheel tandem axle 7. Amber lamp 211 is illuminated along with red lamp 209 in all conditions except the pins fully locked condition when the drive and driven members 61, 65 occupy their start positions, and the pins fully unlocked condition when driven member 65 is in its end position. Thus, illumination of amber lamp 211 indicates a transitory condition requiring caution from the operator. Amber lamp 211 blinks in conditions where rocking trailer 5 would be useful, i.e. when pins 17 are bound or in need of precision alignment with holes 11. Thus, the blinking amber indication informs the operator that rocking is warranted, either to lock or unlock pins 17.

Figure 11:
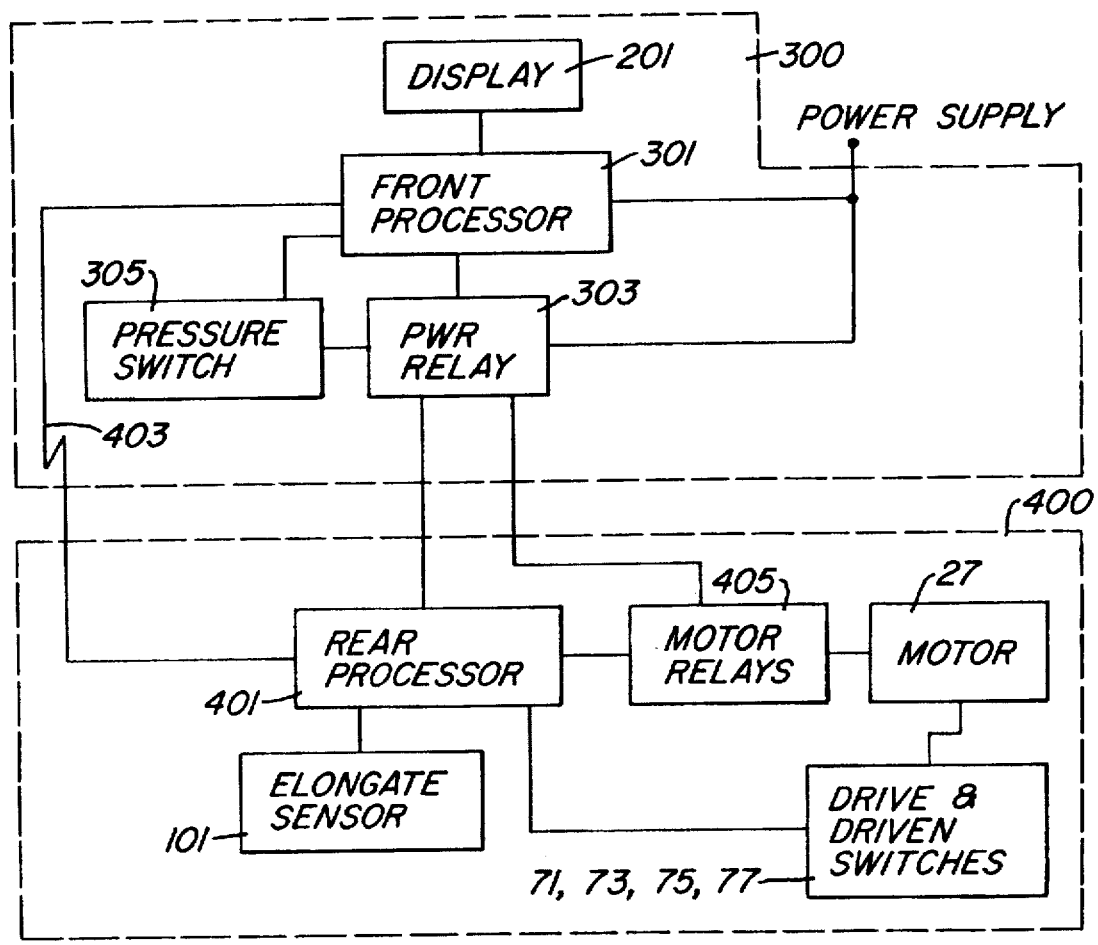
FIG. 11 is a block diagram of the components of the control system of the electrically operated slider release according to the present invention.

FIG. 11 is a block diagram schematically representing electrical components employed in the control of the present invention and that generate the signals that control translator 25 and motor 27 and drive visual display 201. Phantom block 300 generally designates electronic components associated with cab 3 of tractor trailer 1. These components include a front microprocessor 301, which is coupled to visual display 201. Front processor 301 is coupled to the vehicle power supply and to a power relay 303, which controls delivery of power to other components. A pressure switch 305 is coupled to the front processor and to the pneumatic brake system of tractor-trailer 1 to monitor whether the trailer brakes are applied to the wheels of wheel tandem 7.

Phantom block 400 generally designates electronic components associated with trailer 5. These components included a rear microprocessor 401, which is coupled to power relay 303 for power and is in electronic communication with front processor 301 via communication link 403. At least a pair of motor relays 405 are coupled to rear processor 401 and power relay 303. Motor relays 405 control motor 27 and translator 25 as described above. Rear processor 401 is also coupled to drive and driven switches 71, 73, 75, 77 and elongate sensor 101 to control and monitor the signals generated by those components, as described above.

Figure 12A:
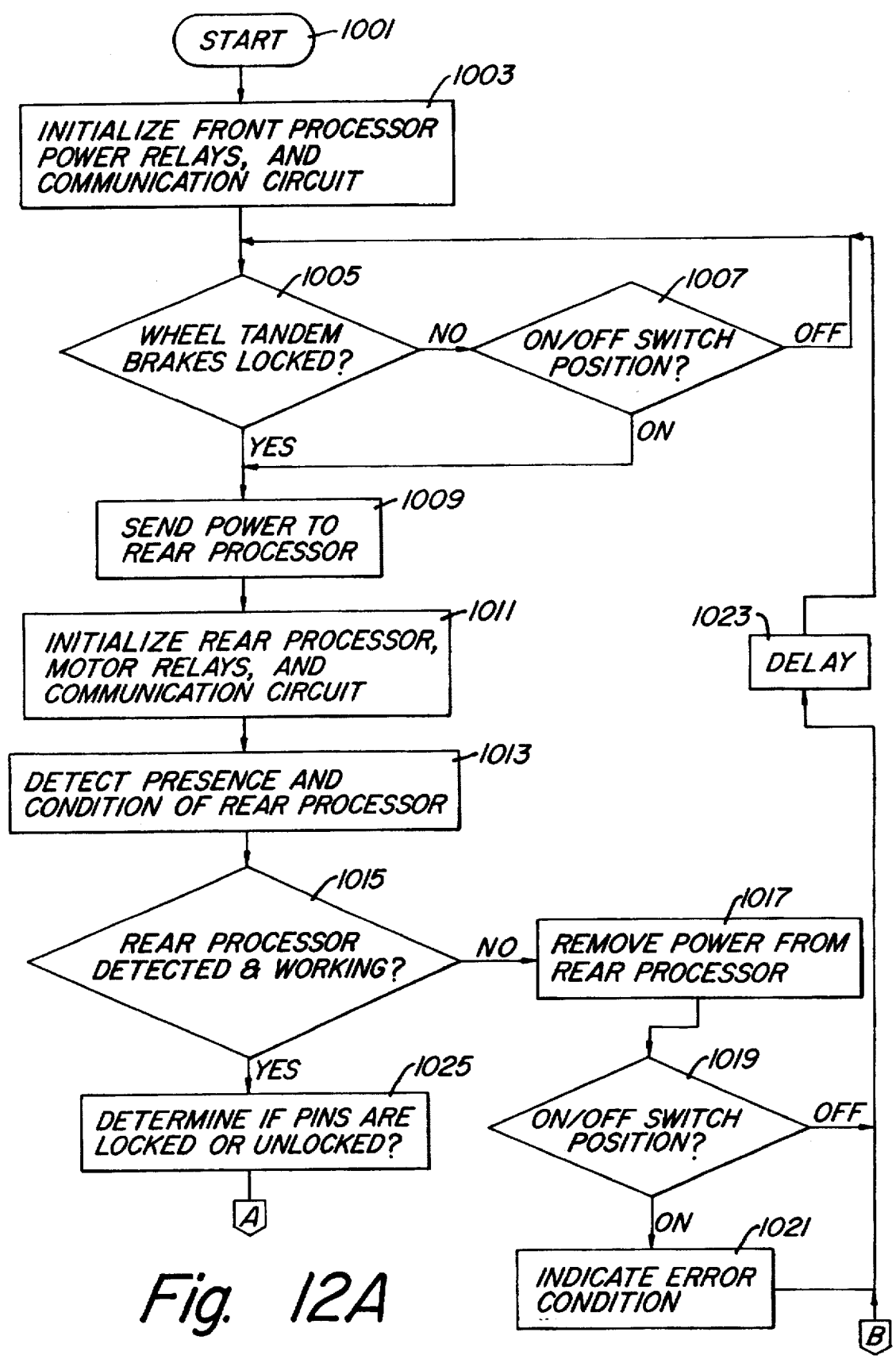
FIGS. 12B and 12C should be read together and depict a high-level logic flowchart of the operation of the method according to the present invention.
Figure 12B:
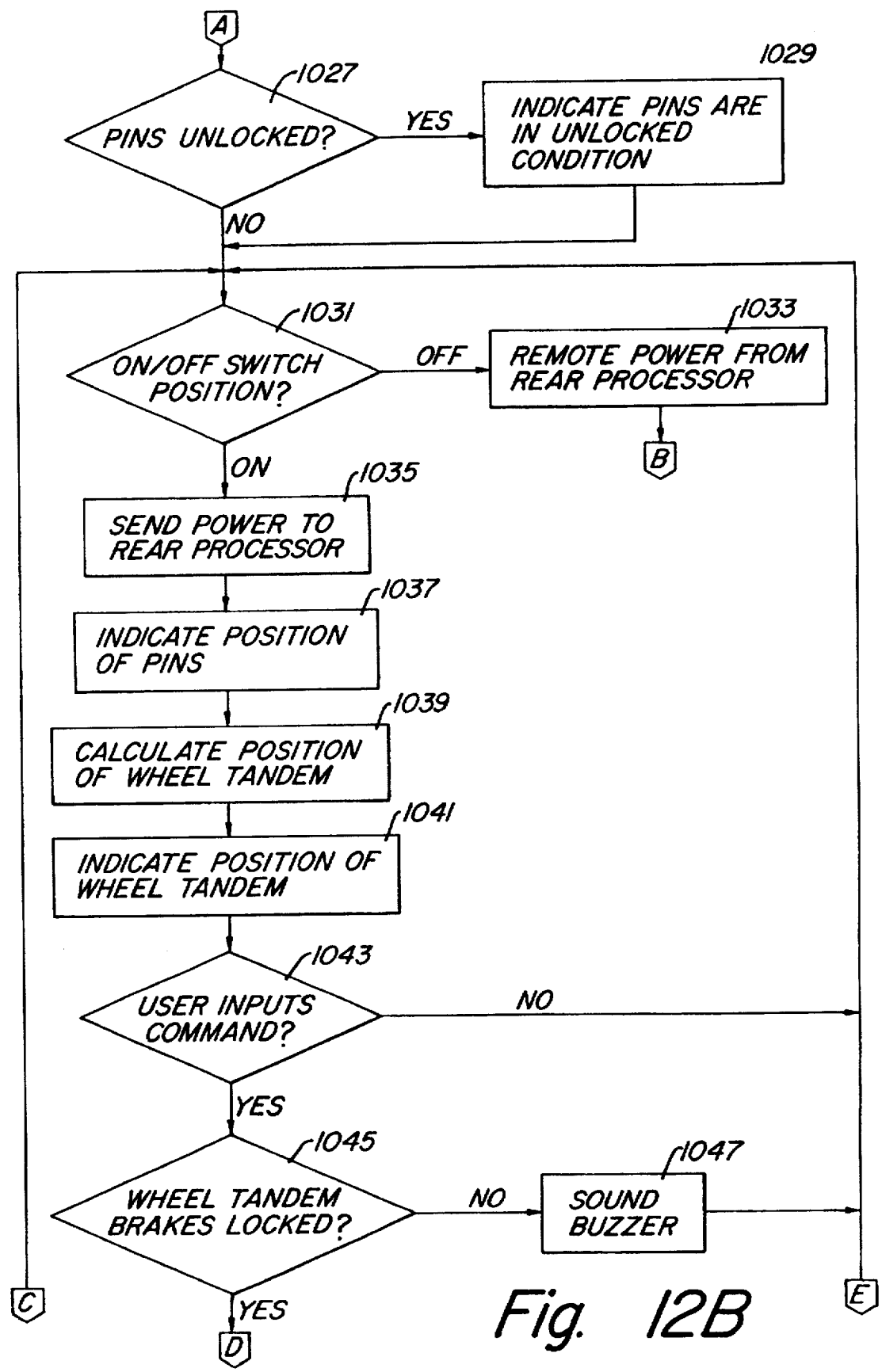
Figure 12C:
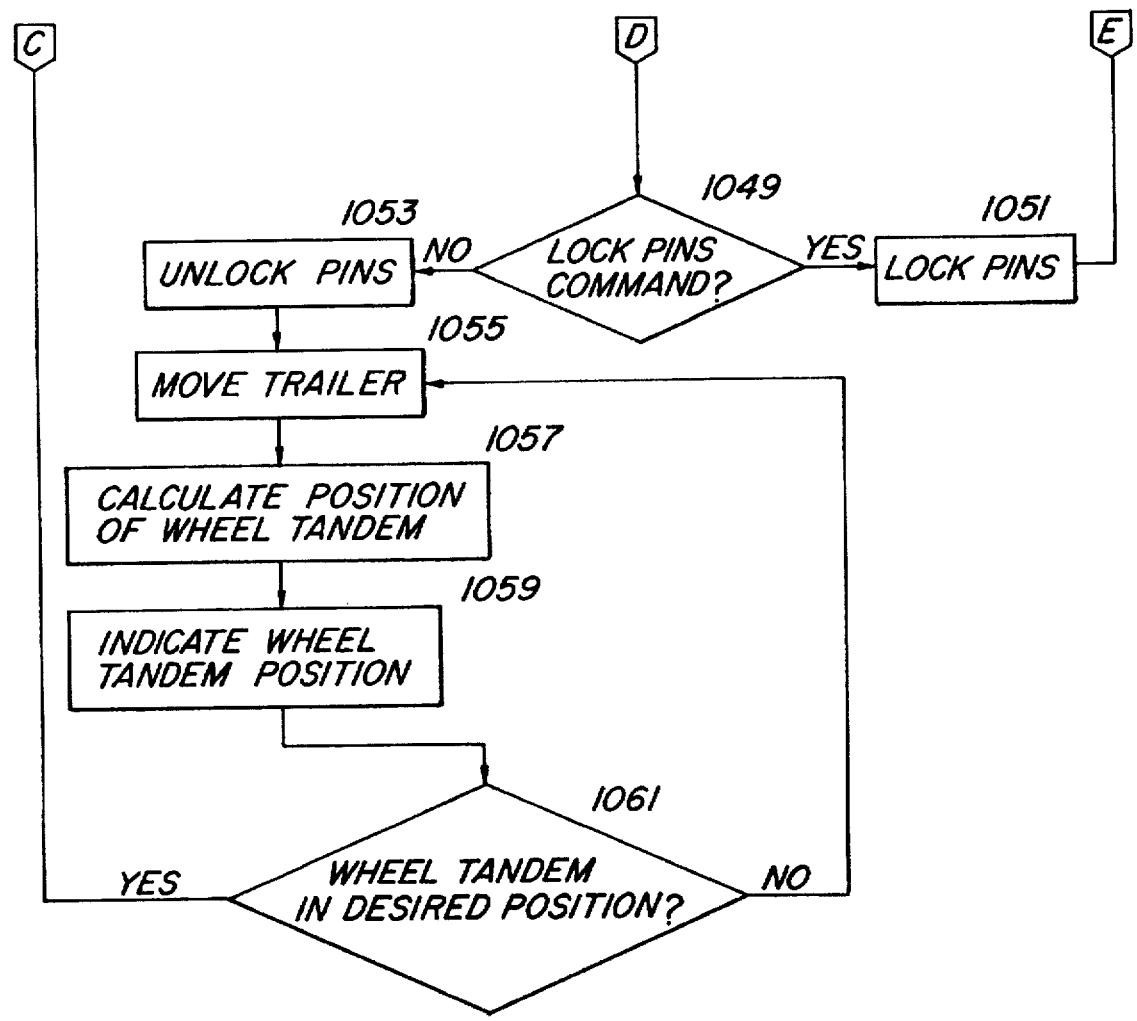

FIGS. 12B and 12C, taken together, are a high-level logic flowchart that illustrates the operation of and process according to the present invention. The process begins at block 1001. Front processor 301, power relay 303, and communication link 403 are initialized, preferably by turning on the ignition of tractor 3 (block 1003). After initialization, front processor 301 interrogates pressure switch 305 to determine whether the brakes associated with wheel tandem 7 are applied (block 1005). If the brakes are not applied, front processor 301 determines whether on/off switch 203 of visual display 201 is in the on or off position. If on/off switch 203 is in the off position, front processor 301 continues to monitor pressure switch 305 until the brakes are applied (block 1007). If either the wheel tandem brakes are applied or on/off switch 203 is in the on position, front processor 301 continues to send power through power relay 303 to rear processor 401 (block 1009). Thus, rear components 400 receive no power unless brakes are applied (the only truly safe condition) or if the operator has on/off switch 203 in the on position, indicating that the operator wishes to determine whether rear components 400 are present and in proper operating condition, or simply desires to check the position of wheel tandem 7 or the condition of pins 17.

Next, rear processor 401 and related components 400 are initialized (block 1011). Front processor 301 interrogates rear processor 401 and communication link 403 to detect whether rear processor 401 and associated electronics are present and if they are in proper operating condition (block 1013). If they are not detected and working (block 1015), front processor 301 removes power from rear processor 401 and components 400 (block 1017). If on/off switch 203 is in the off position, indicating that the operator does not expect the presence of rear electronics 400, front processor 301 will continue to cycle through blocks 1005–1015, thereby continuing to interrogate rear electronics 400 until their presence and proper operating condition are detected. If on/off switch 203 is in the on position, indicating that the operator expects the presence of rear electronics 400, an error condition is indicated (block 1021), and further processing is delayed (block 1023) to permit the operator to respond to the error condition.

If rear electronics 400 are detected and in proper operating condition, rear processor 401 interrogates drive and driven switches 71, 73, 75, 77 associated with translator 25 to determine if pins 17 are in the locked or unlocked condition (block 1025). If pins 17 are in the unlocked condition (in which wheel tandem 7 is free to move relative to trailer 5) the pins are indicated to be in the unlocked condition, preferably by illuminating red lamp 209 and amber lamp 21 of visual display 201 (block 1029), as described in FIG. 10. This step indicates to the operator that he should not attempt to drive off prior to securing pins 17 in a locked condition.

Next, front processor 301 determines whether on/off switch 203 is in the on of off position (block 1031). If switch 203 is off, power is removed from rear processor 401 (block 1033), and front processor 301 continues to interrogate rear electronics 400 through communications like 403 to provide an indication of the potentially unsafe condition in which pins 17 are in the unlocked position (blocks 1005–1029). If on/off switch 203 is in the on position, power is maintained through power relay 303 to rear processor 401 (block 1035). The condition of pins 17 (i.e. locked, unlocked, or in transition) is indicated through lamps 209, 211, 213 as described previously (block 1037). Then, the position of wheel tandem 7 relative to trailer 5 is calculated utilizing elongate sensor 101 (block 1039) and indicated to the operator through numerical display 207 on visual display 201 (block 1041). With the indication of the position of pins 17 and the position of wheel tandem 7 relative to trailer 5 (with which holes 11 in rails 9, pins 17 are aligned), the operator is provided with the information necessary to determine the condition of wheel tandem 7 and whether to initiate the pins lock or unlock sequences, described below with reference to FIGS. 13 and 14.

Next, front processor 301 awaits input of a command through lock/unlock switch 205 of display 201 (block 1043). If no command is received, front and rear processors 301, 401 cycle through blocks 1031–1043 until a command is input or on/off switch 203 is moved into the off position.

If the operator inputs a command, front processor 301 determines whether the brakes associated with wheel tandem 7 are applied or locked (block 1045), and if not, an audible warning, preferably in the form of buzzer 215 on visual display 201, is sounded (block 1047) to warn the operator of a potentially unsafe condition. For example, an audible warning would be given if the operator attempted to unlock pins 17 while tractor-trailer 1 is rolling down the road and the wheel tandem brakes are not applied. After sounding the audible warning, front and rear processors 301, 401 return to the idle state and the erroneous or potentially unsafe command is ignored.

If the wheel tandem brakes are applied (block 1049), the lock pins or unlock pins command is executed. If the lock pins command is given (block 1051), pins 17 are locked. If the unlock pins command is given (block 1053), pins 17 are unlocked, and trailer 5 is free to be moved relative to wheel tandem 7. Rear processor 401 and elongate sensor 101 calculates the position of wheel tandem 7 relative to trailer 5 (block 1057), which is indicated in terms of with which of holes 11 in rails 9 pins 17 are aligned (block 1059). The position of wheel tandem 7 relative to trailer 5 is indicated continuously until wheel tandem 7 is in the desired position, at which point the user inputs a lock pins command (block 1051) to secure wheel tandem 7 against movement relative to trailer 5.

Figure 13:
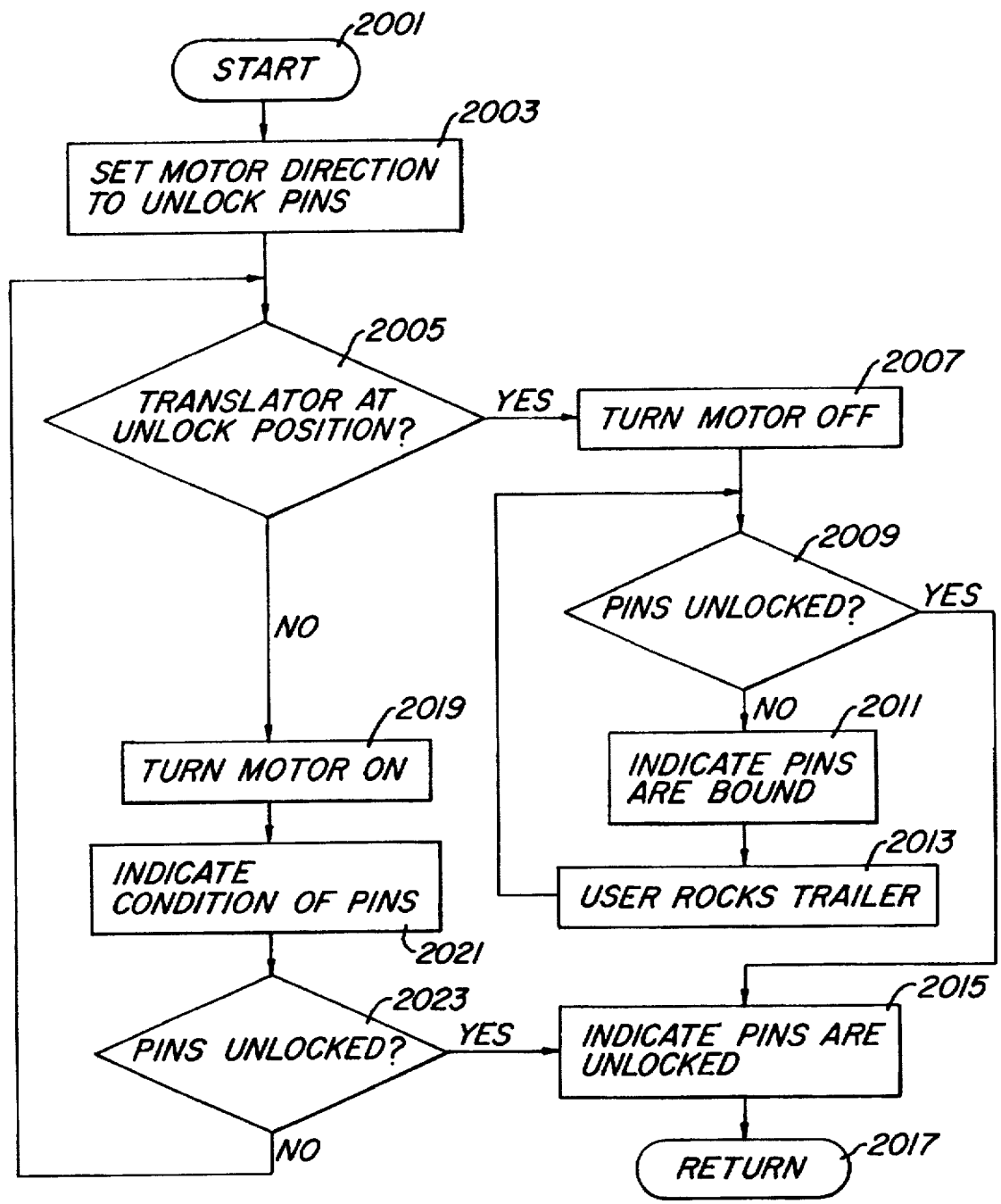
FIG. 13 is a high-level logic flowchart depicting a subroutine related to the flowcharts of FIGS. 12A and 12B.
Figure 14:
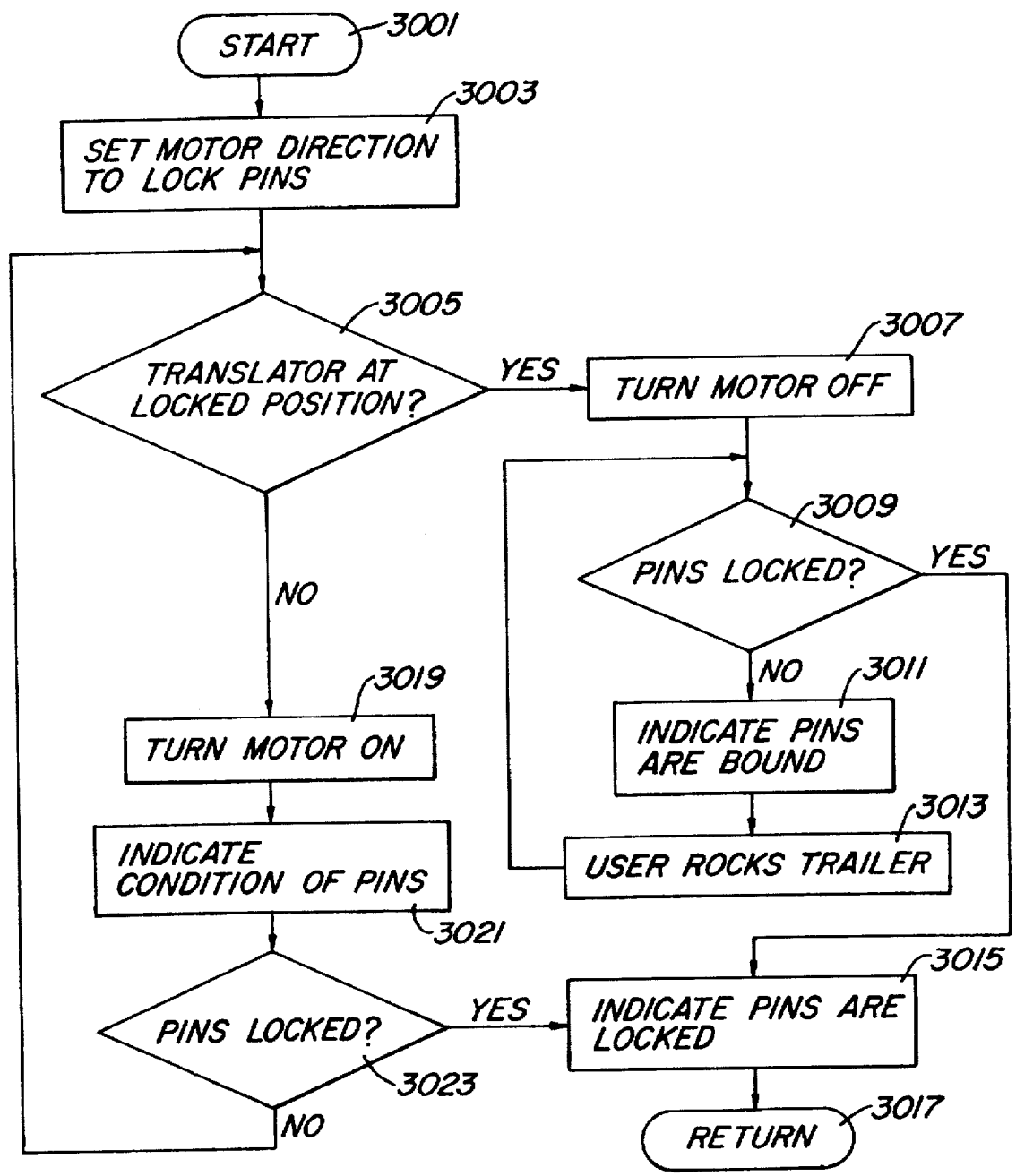
FIG. 14 is a high-level logic flowchart depicting a subroutine related to the flowcharts of FIGS. 12A and 12B.

FIGS. 13 and 14 are high-level logic flowcharts detailing the operation of the pins and pins routines employed by the present invention (depicted as blocks 1051 and 1053 in FIG. 12B). Upon receiving the unlock pins command, the unlock routine commences (block 2001). Next, motor relays 405 are activated to set the direction of motor 27 to unlock pins 17 (block 2003). Rear processor 401 polls drive and driven switches 71, 73, 75, 77 on translator 25 to determine whether motor 27 should be actuated (block 2005). If translator 25 is at the unlocked position, motor 27 is turned off (block 2007). Rear processor 401 then determines whether pins 17 are unlocked (block 2009). If pins 17 are not in the unlocked condition, visual display 201 is illuminated according to the table of FIG. 10 to indicate that pins 17 are bound and unable to retract (block 2011). Responsive to the indication that pins 17 are bound, the operator then rocks trailer to loosen pins 17 momentarily and permit them to move to the unlocked position (block 2013). If translator 25 is not at the unlocked position (block 2005), motor 27 is powered and the condition of pins 17 is indicated until pins 17 are in the unlocked position (blocks 2019–2023).

FIG. 14 details the operation of the lock pins routine employed by the present invention (depicted as block 1051 in FIG. 12B). Upon receiving the lock pins command, the routine commences (block 3001). Next, motor relays 405 are activated to set the direction of motor 27 to lock pins 17 (block 3003). Rear processor 401 polls drive and driven switches 71, 73, 75, 77 on translator 25 to determine whether motor 27 should be actuated (block 3005). If translator 25 is at the locked position, motor 27 is turned off (block 3007). Rear processor 401 then determines whether pins 17 are locked (block 3009). If pins 17 are not in the locked condition, visual display 301 is illuminated according to the table of FIG. 10 to indicate that pins 17 are bound and unable to retract (block 3011). Responsive to the indication that pins 17 are bound, the operator then rocks trailer to loosen pins 17 momentarily and permit them to move the locked position (block 3013). If translator 25 is not at the locked position (block 3005), motor 27 is powered and the condition of pins 17 is indicated until pins 17 are in the locked position (blocks 3019–3023).

With respect to the routines described with reference to FIGS. 13 and 14, it is important to note that no current is supplied to motor 27 until the operator inputs a lock pins or unlock pins command and the wheel tandem brakes are applied. This feature helps insure that motor 27 will not be inadvertently powered to unlock pins 17 while tractor-trailer 1 is in motion.

A principal advantage of the electrically operated slider release according to the present invention is that it is safer and more reliable in operation than prior-art slider releases. The present invention may be installed and operated without interference with the manual slider release commonly provided on tractor-trailers. The present invention does not utilize the pneumatic brake system of the trailer for power, thus increasing safety and reliability of the assembly.

The control and display according to the present invention warns the operator against the following potentially hazardous conditions:

1) the operator attempts to pull the trailer with the pins unlocked regardless of the position of the on/off switch on the visual display; and 2) the operator inadvertently attempts to unlock the pins while the tractor-trailer is rolling down the road. Furthermore, the control system of the electrically operated slider release provide a ready indication of both the condition of the pins and the position of the wheel tandem relative to the trailer. This information is available to the operator simply by moving the on/off switch to the on position. The operator is also warned of the lack or condition of the electrically operated slider release.

The invention has been described with reference to a preferred embodiment thereof. Those having skill in the art will appreciate that it is thus not limited, but is susceptible to variation and modification without departure from the scope and spirit of the invention.

We claim:

1. A counter for use in varying the wheel base of a vehicle having a selectively movable portion coupled thereto and for indicating the position of the movable portion relative to the vehicle, the counter comprising:

an elongate housing adapted to be carried by one of the vehicle and the movable portion;

an electrical conductor disposed in the elongate housing;

a plurality of magnetic sensors electrically coupled to the conductor at positions corresponding to locations of the movable portion;

a plurality of resistors coupled in parallel to the electrical conductor and between the magnetic sensors, each resistor having a resistance different from that of the other resistors;

a magnet adapted to be carried by another of the vehicle and movable portion and in proximity to the elongate housing, wherein relative movement between the vehicle and the movable portion aligns the magnet with one of the plurality of magnetic sensors, thereby closing an electrical circuit through the magnetic sensor, the resistor, and the electrical conductor, the circuit having a signal characteristic indicative of the position of the movable portion relative to the vehicle.

2. The counter according to claim 1 wherein the vehicle is a tractor-trailer and the movable portion is a wheel tandem.

3. The counter according to claim 1 wherein the elongate housing comprises:

a non-magnetic tubular housing;

a filler to maintain the position of the magnetic sensors in the tubular housing; and at least one fastener to secure the housing to one of the vehicle and movable portion.

4. The counter according to claim 1 wherein the magnetic sensors are reed switches.

5. A counter for use in varying the wheel base of a vehicle having a selectively movable portion coupled thereto, the counter comprising:

an elongate, non-magnetic, tubular housing adapted to be carried by one of the vehicle and the movable portion;

an electrical conductor disposed in the housing;

a plurality of magnetic sensors coupled to the conductor at positions corresponding to positions of the movable portion;

a filler member disposed in the housing to maintain the magnetic sensors in their positions, a plurality of resistors coupled in electrically parallel relation to one another and to the electrical conductor, one resistor being coupled between each pair of magnetic sensors and each resistor having a resistance different from that of the other resistors;

a magnet adapted to be carried by another of the vehicle and movable portion and in proximity to the elongate housing, wherein relative movement between the vehicle and the movable portion aligns the magnet with one of the plurality of magnetic sensors, thereby closing an electrical circuit through the magnetic sensor, the resistor, and the electrical conductor, the circuit having a signal characteristic indicative of the position of the movable portion relative to the vehicle.

6. The counter according to claim 5 wherein the magnetic sensors are reed switches.

7. The counter according to claim 5 wherein the vehicle is a tractor trailer and the movable portion is a wheel tandem.

8. A counter for use in varying the wheel base of a tractor-trailer having a selectively movable portion coupled thereto, the counter comprising:

an elongate, non-magnetic, tubular housing adapted to be carried by one of the tractor-trailer and the movable portion;

an electrical conductor disposed in the housing;

a plurality of magnetic sensors coupled to the conductor at positions corresponding to positions of the movable portion;

a filler member disposed in the housing to maintain the magnetic sensors in their positions.

a plurality of resistors coupled in electrically parallel relation to one another and to the electrical conductor, one resistor being coupled between each pair of magnetic sensors and each resistor having a resistance different from that of the other resistors;

a magnet adapted to be carried by another of the tractor-trailer and movable portion and in proximity to the elongate housing, wherein relative movement between the tractor-trailer and the movable portion aligns the magnet with one of the plurality of magnetic sensors, thereby closing an electrical circuit through the magnetic sensor, the resistor, and the electrical conductor, the circuit having a signal characteristic indicative of the position of the movable portion relative to the tractor-trailer.

9. The counter according to claim 8 wherein the magnetic sensors are reed switches.

10. The counter according to claim 8 wherein the movable portion is a wheel tandem.

* * * * *